United States Patent
Manojlovic et al.

(10) Patent No.: US 10,048,997 B2
(45) Date of Patent: Aug. 14, 2018

(54) SINGLE EVENT LATCH UP MITIGATION IN SOLID STATE POWER CONTROLLERS

(71) Applicant: HAMILTON SUNDSTRAND CORPORATION, Charlotte, NC (US)

(72) Inventors: Milorad Manojlovic, Loves Park, IL (US); Christian Miller, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1 day.

(21) Appl. No.: 15/146,029

(22) Filed: May 4, 2016

(65) Prior Publication Data

US 2017/0322839 A1 Nov. 9, 2017

(51) Int. Cl.
| | |
|---|---|
| *G06F 11/00* | (2006.01) |
| *G06F 11/07* | (2006.01) |
| *G06F 1/32* | (2006.01) |
| *G06F 1/30* | (2006.01) |

(52) U.S. Cl.
CPC ............ *G06F 11/079* (2013.01); *G06F 1/30* (2013.01); *G06F 1/3296* (2013.01); *G06F 11/0721* (2013.01)

(58) Field of Classification Search
CPC ............ G06F 11/079; G06F 11/0721; G06F 11/0766; G06F 11/1441; G06F 11/2015; G06F 1/3296
See application file for complete search history.

(56) References Cited

U.S. PATENT DOCUMENTS

| | | | |
|---|---|---|---|
| 6,064,555 | A | 5/2000 | Czajkowski et al. |
| 7,652,862 | B2 | 1/2010 | Martins |
| 7,656,633 | B2 | 2/2010 | Kilroy et al. |
| 7,710,697 | B2 | 5/2010 | Michalko et al. |
| 7,907,378 | B2 | 3/2011 | Julicher |
| 8,390,151 | B2 | 3/2013 | Rozman et al. |
| 2005/0162794 | A1 | 7/2005 | Donnelly et al. |

(Continued)

FOREIGN PATENT DOCUMENTS

| | | | |
|---|---|---|---|
| EP | 2600478 A2 | 6/2013 | |
| EP | 2626973 A1 | 8/2013 | |
| WO | WO 2016080909 A1 * | 5/2016 | ............... H02H 3/08 |

OTHER PUBLICATIONS

European Search Report for EP Application No. 17169420.1 dated Nov. 16, 2017; 12 pages.

*Primary Examiner* — Joseph D Manoskey
(74) *Attorney, Agent, or Firm* — Cantor Colburn LLP

(57) ABSTRACT

A system for mitigating a solid state power controller (SSPC) open fault caused by single event latchup (SEL) on a power module includes a microprocessor in a control communication and power supply module (CCP) configured to determine whether communication with a microcontroller in at least one of a solid state power controller (SSPC) and a second SSPC in the power module is lost. The microprocessor in the CCP is operatively connected to the power module and configured to notify, via a backplane communication bus, the microcontroller on the power module that the communication with the SSPC in the power module is lost. The microcontroller in the SSPC is configured to set a low power operation of a second SSPC in the power module not affected by SEL in response to loss of reception of command messages from the microprocessor in the CCP.

9 Claims, 2 Drawing Sheets

(56) References Cited

U.S. PATENT DOCUMENTS

| | | | |
|---|---|---|---|
| 2005/0223260 A1* | 10/2005 | Kinstler | G06F 11/0745 713/340 |
| 2006/0071559 A1* | 4/2006 | Hanson | H02J 4/00 307/43 |
| 2006/0126246 A1 | 6/2006 | Hussein et al. | |
| 2006/0200688 A1* | 9/2006 | Tofigh | H02H 1/0015 713/300 |
| 2007/0236852 A1* | 10/2007 | Plivcic | H02J 1/14 361/115 |
| 2007/0262652 A1* | 11/2007 | Kilroy | H03K 17/0822 307/116 |
| 2008/0151456 A1* | 6/2008 | Julicher | G06F 1/28 361/93.4 |
| 2008/0303353 A1* | 12/2008 | Yu | H02J 13/0003 307/131 |
| 2009/0212975 A1* | 8/2009 | Ausman | G01R 31/3277 340/945 |
| 2015/0370274 A1 | 12/2015 | Wilberg et al. | |

* cited by examiner

SINGLE EVENT LATCH UP MITIGATION IN SOLID STATE POWER CONTROLLERS

BACKGROUND

The present disclosure relates to single event latchup, and more specifically, to mitigating single event latchup (SEL) in microcontrollers employed in solid state power controllers (SSPC).

Cosmic radiation can induce Single Event Latchup (SEL) in complex electronic devices. In aerospace this may be a particular problem due to higher radiation intensities and system criticality. Certain flight paths have increasing probability of SEL due to global magnetic variances and/or atmospheric conditions. Further, SEL may become more likely at certain polar orientations where cosmic radiation intensity is higher.

Peripheral Interface Controllers (PICs) and other electronic devices are affected by SEL caused by cosmic radiation that interferes with the state of transistors by disrupting charge associated with memory devices or gate control state of a field effect transistor (FET). Solid state power controllers (SSPC) may switch power on and off to electrical loads (e.g., displays, components, etc.). The SSPCs may be controlled by PICs that monitor voltage and current status, and drive field effect transistor gates to turn the power on and off in the load circuits. SEL may cause the transistor gates to shift from their proper state to an erroneous state. Sometimes radiation induced malfunction may be benign because of circuitry design or built-in circuit redundancy. In other cases, radiation may cause a single event upset (a temporary problem that may be recoverable by the system), or a circuit event latch that requires reset of the device. A latchup condition may turn into a burnout condition where excess current burns up the component.

On ground level, SEL causes errors in non-aerospace electronic products in power distribution applications, where non-impacted channels or devices sharing a common power supply with the impacted devices experience diminished power quality. Server farms are also affected by SEL, where latch conditions can cause interruption of service or threaten data persistence. In ground vehicles, SEL can cause vehicle malfunctions in power and electronic control systems.

SUMMARY

According to an embodiment of the present invention, a computer-implemented method for mitigating a solid state power controller (SSPC) open fault caused by single event latchup (SEL) on a power module is described. The method may include determining, with a microprocessor in a control communication and power supply module (CCP), whether communication with a microcontroller in at least one of a solid state power controller (SSPC) and a second SSPC in the power module is lost; notifying, with the microprocessor in the power module, via a backplane communication bus, the microcontroller on the CCP that the communication with at least one of the SSPC and the second SSPC in the power module is lost; setting, with the microcontroller in the SSPC, the low power operation of a second SSPC in the power module not affected by SEL in response to loss of reception of command messages from the microprocessor in the CCP; and clearing the open fault.

A system for mitigating a solid state power controller (SSPC) open fault caused by single event latchup (SEL) on a power module is described. The system may include a microprocessor in a control communication and power supply module (CCP) configured to determine whether communication with a microcontroller in at least one of a solid state power controller (SSPC) and a second SSPC in the power module is lost; the microprocessor in the CCP operatively connected to the power module and configured to notify, via the backplane communication bus, the microcontroller on the power module that the communication with at least one of the SSPC and the second SSPC in the power module is lost. In some aspects the microcontroller in the SSPC is configured to set the low power operation of a second SSPC in the power module not affected by SEL in response to loss of reception of command messages from the microprocessor in the CCP.

According to yet other embodiments, a computer program product for mitigating an SSPC open fault caused by SEL on a power module, the computer program product comprising a computer readable storage medium having program instructions embodied therewith, wherein the computer readable storage medium is not a transitory signal per se, the program instructions executable by one or more of at least one microprocessor and a microcontroller on the power module to perform a method. The method may include determining, with a microprocessor in a control communication and power supply module (CCP), whether communication with a microcontroller in at least one of a solid state power controller (SSPC) and a microcontroller in the power module is lost; notifying, with the microprocessor in the power module, via a backplane communication bus, the microcontroller on the CCP that the communication with at least one of the SSPC and the second SSPC in the power module is lost; setting, with the microcontroller in the SSPC, the low power operation of a second SSPC in the power module not affected by SEL in response to loss of reception of command messages from the microprocessor in the CCP; and clearing the open fault.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
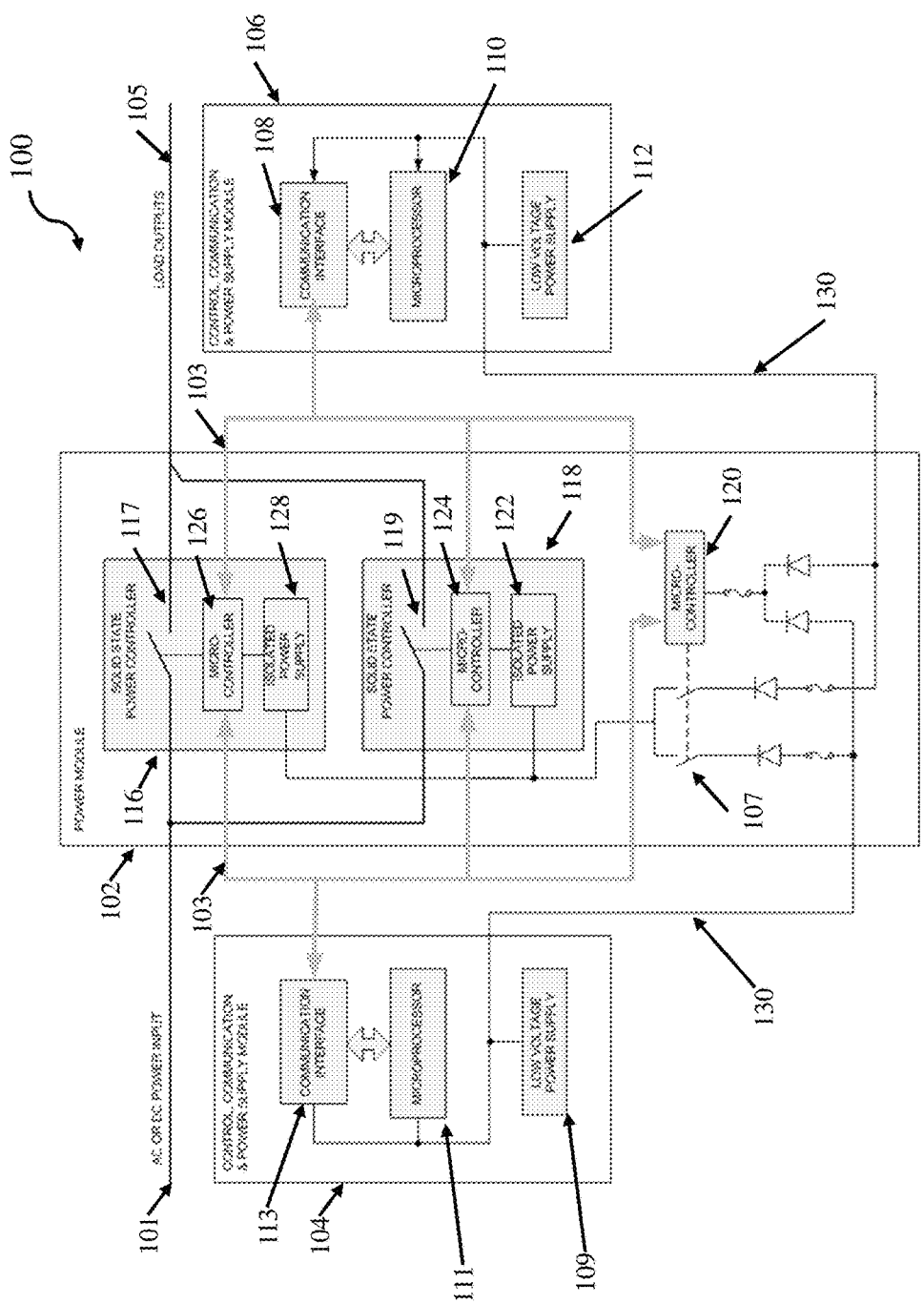
FIG. 1 depicts a system for mitigating an SSPC open fault caused by SEL on a power module according to one embodiment.

FIG. 1 depicts a system 100 for mitigating an SSPC open fault caused by SEL on a power module 102, according to one embodiment. System 100 can include at least one power module 102 and one or two control, communication, and power supply modules (CCP) 104 and 106 (hereafter "CCPs 104 and 106"). Power module 102 may be operatively connected with CCPs 104 and 106 via one or more control power buses 130 and one or more backplane communication buses 103. System 100 may receive main (operational) power from power input 101, which may be either AC or DC power. Load outputs may be connected to system 100 via load outputs lines 105. Power module 102 may include at least one solid state power controller such as, for example solid state power controllers 116 and 118. Power module 102 may also include a microcontroller 120 that controls power inputs from low voltage power supply to solid state power controllers 116 and 118. Solid state power controllers 116 and 118 may send and receive communication signals to and from CCPs 104 and 106 via backplane communication bus 103.

Solid state power controller 116 (also referred to hereafter as "SSPC 116") may include a microcontroller 126, a power switching device 117 and an isolated power supply 128. Isolated power supply 128 may be operatively connected to power bus 130 via switches controlled by microcontroller 120, and configured to supply power continuity to microcontroller 126.

Solid-state power controller 118 (also referred to hereafter as "SSPC 118") may include a microcontroller 124, a power switching device 119 and an isolated power supply 122. Isolated power supply 122 may be operatively connected via power bus 130 via switches controlled by microcontroller 120.

Microcontrollers 120, 124, and 126 can each be considered a self-contained system that may include one or more of a processor, non-transitory computer-readable memory, and further include peripherals. Microcontrollers 120, 124, and 126 may be used as embedded systems. For example, microcontroller 120 may be computer on a single integrated circuit containing a processor core, memory, and programmable input/output peripherals (not shown). Program memory in the form of electronic non-volatile computer storage, NOR flash, or electrically erasable programmable read-only memory (EEPROM) may also be included on a chip in microcontroller 120. Microcontroller 120 may also include RAM (not shown) for temporary storage of data used during the program execution. The instructions may include one or more separate programs, each of which comprises an ordered listing of computer-executable instructions for implementing logical functions.

Microcontroller 120 may be configured to switch control power 130 from one or two of low voltage power supplies 109 and 112. Microcontroller 120 may cycle control power from low voltage power supply 109 and/or 112 to the SSPCs on the power module for a predetermined time duration in response to command received via backplane communication bus from the control, communication and power supply module. According to some embodiments, the predetermined time duration can be, for example, a time interval between 1.0 ms and 2.0 ms, which may clear a latch-up condition inducted by SEL or other interference. In some aspects, microcontroller 120 may operate switches 107 to cycle the control power to solid state power controllers 116 and 118 to clear latchup condition in microcontrollers 126 and 128.

CCP 104 may include a microprocessor 111 that may be connected to power module 102 via a communication interface 113. Communication interface 113 may be operatively connected to power module 102 via backplane communication bus 103.

Microprocessors 110 and 111 may be a computer processor incorporating the functions of a computer central processing unit (CPU) on a single integrated circuit (IC) (not shown). Microprocessors 110 and 111 may also include and/or be operatively connected to non-volatile computer storage flash memory (not shown), which may include one or more computer program products that include computer executable instructions for mitigating an SSPC open fault on power module 102. The instructions may include one or more separate programs, each of which comprises an ordered listing of computer-executable instructions for implementing logical functions.

Microprocessors 110 and/or 111 may be configured to determine whether communication with a solid state power controller (SSPC) (e.g., SSPCs 116 and/or 118) in power module 102 is lost, and notify microcontroller on the power module (e.g., microcontroller 126 and/or 128) via backplane communication bus 103 that the communication with one of the SSPCs in power module 102 is lost. In other aspects, microprocessors 110 and/or 111 may inhibit of command messages to all the SSPCs in the power module. Microprocessors 110 and/or 111 may transmit command via the backplane communication bus to the power module microcontroller 120 to cycle the control power to the SSPCs on the power module to clear the SEL.

CCP 106 may include a microprocessor 110 that may be connected to power module 102 via a communication interface 108. Communication interface 108 may be operatively connected to power module 102 via backplane communication bus 103.

Figure 2:
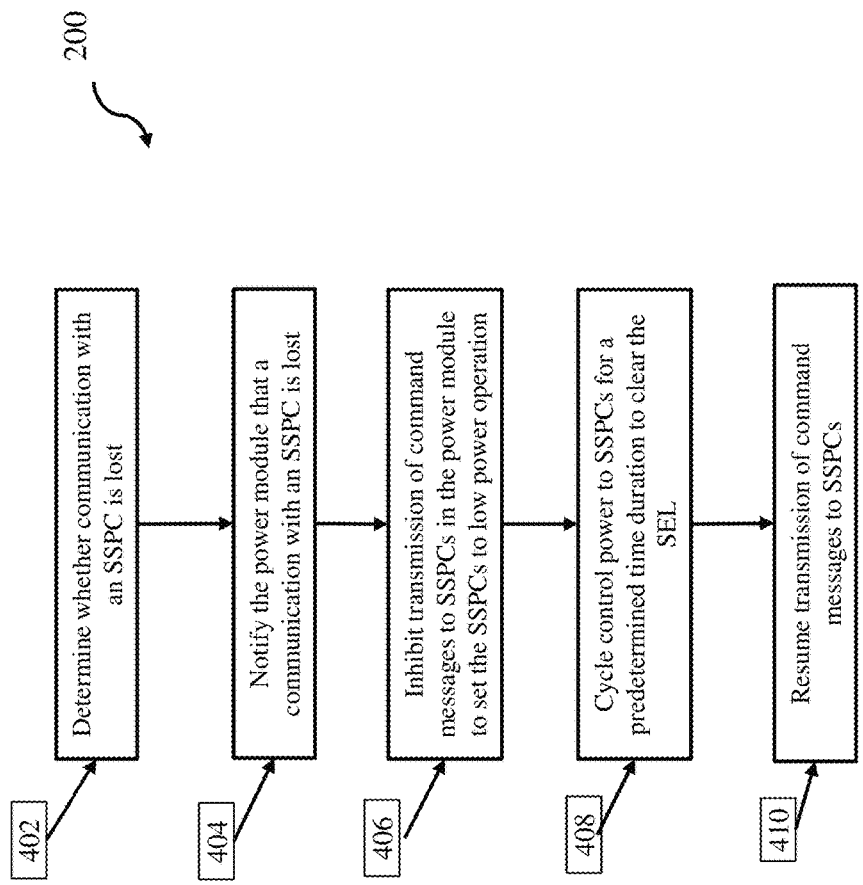
FIG. 2 depicts a flow diagram of a method for mitigating an SSPC open fault on a power module according to one embodiment.

FIG. 2 depicts a flow diagram of a method 200 for mitigating an SSPC open fault on a power module according to one embodiment. Referring now to FIG. 2, as shown in block 402, system 100 may determine whether communication with an SSPC 116 or 118 on a in power module 102 is lost.

As shown in block 404, system 100 may notify microcontroller 120 on power module 102 via backplane communication bus 103 that the communication with one of the SSPCs on power module 102 is lost.

System 100 may inhibit, with microprocessor 104 and 106, transmission of command messages to the SSPCs 116 and 118, as shown in block 406 to set the SSPC to low power mode operation.

As shown in block 408, system 100 may cycle control power for a predetermined time duration by transmitting, with microprocessor 110 or 111, a command to power module microcontroller to cycle control power from a respective low voltage power supply 109 and/or 112 to the SSPC 116 and 118 for a predetermined time duration to clear SEL.

As shown in block 410, system 100 may resume communication with the SSPCs 116 and 118 after the SEL is cleared to resume power switching control to SSPC loads The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for mitigating a solid state power controller (SSPC) open fault caused by single event latchup (SEL) on a power module comprising:
   determining, with a microprocessor in a control communication and power supply module (CCP), whether communication with a microcontroller in at least one of a solid state power controller (SSPC) and a second SSPC in the power module is lost;
   notifying, with the microprocessor in the power module, via a backplane communication bus, the microcontroller on the CCP that the communication with at least one of the SSPC and the second SSPC in the power module is lost;
   inhibiting transmission of command messages to at least one of the SSPC and the second SSPC in the power module, and entering the low power operation based on inhibition of the command messages;

setting, with the microcontroller in the SSPC, a low power operation of a second SSPC in the power module not affected by SEL in response to loss of reception of command messages from the microprocessor in the CCP; and clearing the open fault.

2. The method of claim 1, further comprising after setting the low power operation:

transmitting, with the CCP, a command to the microcontroller on the power module to cycle control power from a low voltage power supply to at least one of the SSPC and the second SSPC in the power module for a predetermined time duration;

cycling, with the microcontroller in the power module, the control power from the low voltage power supply to at least one of the SSPC and the second SSPC in the power module for a predetermined time duration to clear the SEL;

clearing the open fault;

resuming, with the microprocessor in the CCP, the transmission of command messages to at least one of the SSPC and the second SSPC in the power module after the SEL is cleared; and restoring, with the microcontroller in the SSPC, the normal operation of the SSPC in the power module in response to command messages from the microprocessor in the control, communication and power supply module.

3. The computer-implemented method of claim 1, wherein the predetermined time duration is a time interval between 1.0 ms and 2.0 ms.

4. A system for mitigating a solid state power controller (SSPC) open fault caused by single event latchup (SEL) on a power module comprising:

a microprocessor in a control communication and power supply module (CCP) configured to determine whether communication with a microcontroller in at least one of a solid state power controller (SSPC) and a second SSPC in the power module is lost;

the microprocessor in the CCP operatively connected to the power module and configured to:

inhibit transmission of command messages to at least one of the SSPC and the second SSPC in the power module, and entering the low power operation based on inhibition of the command messages; and notify, via a backplane communication bus, the microcontroller on the power module that the communication with the SSPC in the power module is lost, wherein:

the microcontroller in the SSPC is configured to set a low power operation of a second SSPC in the power module not affected by SEL in response to loss of reception of command messages from the microprocessor in the CCP.

5. The system of claim 4, wherein:

the microprocessor in the CCP is configured to transmit a command to the microcontroller on the power module to cycle control power from a low voltage power supply to at least one of the SSPC and the second SSPC in the power module for a predetermined time duration;

the microcontroller in the power module is configured to cycle the control power from the low voltage power supply to at least one of the SSPC and the second SSPC in the power module for a predetermined time duration to clear the SEL;

the microprocessor in the CCP is configured to resume the transmission of command messages to at least one of the SSPC and the second SSPC in the power module after the SEL is cleared; and the microcontroller in the SSPC is configured to restore the normal operation of the SSPC in the power module in response to command messages from the microprocessor in the control, communication and power supply module.

6. The system of claim 4, wherein the predetermined time duration is a time interval between 1.0 ms and 2.0 ms.

7. A computer program product for mitigating a solid state power controller (SSPC) open fault caused by single event latchup (SEL) on a power module, the computer program product comprising a computer readable storage medium having program instructions embodied therewith, wherein the computer readable storage medium is not a transitory signal per se, the program instructions executable by one or more of a microprocessor in a control communication and power supply module (CCP) and one or more microcontrollers in at least one of a solid state power controller (SSPC) and a microcontroller in the power module, to perform a method comprising:

determining, with a microprocessor in the CCP, whether communication with a microcontroller in the at least one of a SSPC and a second SSPC in the power module is lost;

notifying, with the microprocessor in the CCP, via a backplane communication bus, the microcontroller on the power module that the communication with the SSPC in the power module is lost;

inhibiting transmission of command messages to at least one of the SSPC and the second SSPC in the power module, and entering the low power operation based on inhibition of the command messages;

setting, with the microcontroller in the SSPC, a low power operation of a second SSPC in the power module not affected by SEL in response to loss of reception of command messages from the microprocessor in the CCP; and clearing the open fault.

8. The computer program product of claim 7, wherein the method further comprises:

transmitting, with the microprocessor in the CCP, a command to the microcontroller on the power module to cycle control power from a low voltage power supply to at least one of the SSPC and the second SSPC in the power module for a predetermined time duration;

cycling, with the microcontroller in the power module, the control power from the low voltage power supply to at least one of the SSPC and the second SSPC in the power module for a predetermined time duration to clear the SEL;

resuming, with the microprocessor in the CCP, the transmission of command messages to at least one of the SSPC and the second SSPC in the power module after the SEL is cleared; and restoring, with the microcontroller in the SSPC, the normal operation of the SSPC in the power module in response to command messages from the microprocessor in the control, communication and power supply module.

9. The computer program product of claim 7, wherein the predetermined time duration is a time interval between 1.0 ms and 2.0 ms.

* * * * *